March 5, 1963 H. L. MYERS 3,079,676
COMPOSITE ARTICLE WITH TUNGSTEN AND COPPER PARTS
Filed March 25, 1959

INVENTOR
HERMAN L. MYERS
BY
ATTORNEY 3,079,676
COMPOSITE ARTICLE WITH TUNGSTEN
AND COPPER PARTS
Herman L. Myers, West Newton, Mass., assignor to Raytheon Company, Lexington, Mass., a corporation of Delaware
Filed Mar. 25, 1959, Ser. No. 801,958
1 Claim. (Cl. 29—194)

This invention relates to brazing materials and more particularly to brazing materials for brazing or soldering a tungsten part to another high-melting part such as tungsten or to a part having a lower melting point.

In the manufacture of vacuum tubes or the like it is frequently necessary to join tungsten with copper, nickel, molybdenum and various other alloys to give a composite product that is structurally strong and adaptable to service conditions. It has been common practice heretofore to use alloys of copper, silver, gold and nickel either in binary or ternary compounds to join tungsten with metals other than tungsten. Prior low temperature solders or brazing materials, generally referred to as solders, are substantially insoluble with tungsten and hence merely surround the tungsten and provide a weak and superficial mechanical surface bond. Prior high temperature solders or brazing materials, generally referred to as brazing materials, on the other hand will adhere to tungsten but their high melting point prohibits their use with many metals. Such compounds also result in recrystallization and the formation of inter-metallic compounds which makes the tungsten brittle.

Among the objects of this invention is to provide a material for uniting two tungsten parts on a tungsten part with another metal part.

Another object of this invention is to provide an alloy that is soluble with tungsten and that is ductile.

A further object of this invention is to provide an alloy that is soluble with and that will wet tungsten, that is ductile and that may have different melting temperatures.

Other objects and many of the attendant advantages of the invention will be readily appreciated as the same becomes better understood by reference to the following detailed description when considered in connection with the accompanying drawing wherein.

Figure 1:
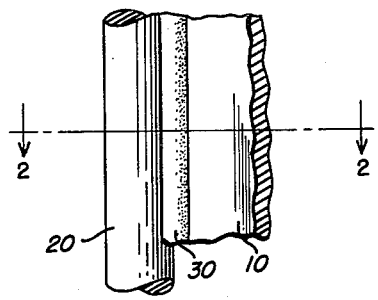
FIG. 1 is a side view, partly cut away, of a plate and a rod joined together with a composition in accordance with the present invention.

In order to produce a strong brazed or soldered joint between two body parts of tungsten for use in applications such as vacuum tubes it is essential to provide a brazing material which will melt at a temperature above the maximum working temperature, and which will readily wet and not adversely react with tungsten. Powdered nickel, platinum and similar metals and the compounds referred to hereinabove have been found unsatisfactory for such purposes.

In the brazing process a brazing composition which has a fairly constant and predetermined melting point is desirable. The melting point of the brazing compound should be less than the melting point of the metal parts to be brazed or joined and yet should not be so low as to permit separation of the parts in the normal use of the product. Further, the brazing compound must be soluble with or wet the surface of the parts to be joined.

The present invention is based on the discovery that gold-copper-cobalt composition having a cobalt content in the critical range of 0.5 to 2.0 percent is very effective in providing a strong brazing joint between two parts of tungsten or tungsten and another metal such as, for example, copper. Unless otherwise stated, all proportions are given herein by weight.

When the composition is applied in conventional manner to tungsten metal the cobalt diffuses into or wets the tungsten to provide a strong joint. If the cobalt content is increased, both the solubility of the composition with tungsten and the melting point of the composition will be increased and vice versa. The cobalt content is, however, critical in that a content greater than about 2 percent results in an excessively high melting temperature and/or deterioration of the desirable characteristics of the tungsten while a cobalt content less than about 0.5 percent will not provide a satisfactory bond with tungsten.

The complete range of the composition of the invention is approximately 0.5 to 2.0 percent cobalt and gold and copper in the ratio of respectively about 3.3:1 as the cobalt content is modified.

The preferred range of the composition of the invention for joining tungsten and copper is approximately

| | Percent |
|---|---|
| Gold | 75.70 to 76.30 |
| Copper | 22.40 to 23.60 |
| Cobalt | 0.70 to 1.30 |

The preferred composition has an effective temperature range of about 900±25° C.

The brazing composition of the invention may be formed in accordance with conventional alloying techniques as by mixing the components in liquid phase and thereafter forming the composition to the desired form such as, for example, as a strip or wire. The compound may be applied to the parts to be joined in conventional manner such as, for example, by heating the parts to be joined to at least the melting temperature of the composition and thereafter applying the composition to the heated portions of the parts to be joined. Another convenient method of applying the brazing compound to the parts is to first make a slurry of the compound in powder form with water, alcohol or similar volatile liquid and apply the slurry to one or both of the parts to be united. The parts and compound may thereafter be heated to the proper temperature in any conventional manner.

Figure 2:
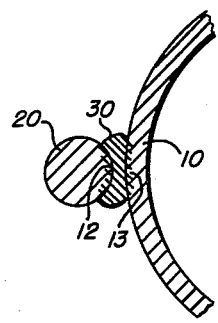
FIG. 2 is a cross section of the same device along line 2—2 of FIG. 1.
Figure 3:
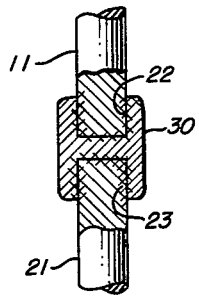
FIG. 3 is a sectional side view of two rods joined together in accordance with the present invention.

In a typical application of the invention illustrated in FIGS. 1–3 a plate or anode 10 of sheet metal such as tungsten is united to a rod 20 of similar material by the brazing material 30 of the invention. In the brazing process there is a certain amount of diffusion of the cobalt into the metal parts 10 and 20. This diffusion of the brazing compound 30 of the invention into parts 10 and 20 makes a stronger bond. If desired the brazing compound 30 as shown in FIG. 2 may be reduced to a thin layer such that the parts 10 and 20 are in contact one with another. As shown in FIG. 2 the numerals 12—13 indicate the area of depth of diffusion of the composition of the invention which depth is small in comparison to the size or thickness of the parts to be joined. This effect is critical with respect to the joining of tungsten wires having a small diameter. Complete diffusion is to be avoided because it destroys desirable characteristics of the tungsten.

FIG. 3 shows two rods 11 and 21 united by brazing material 30. As in FIG. 2, the depth of diffusion 22—23 is small in comparison to the diameter of the rods 11 and 21. In the figures shown, one or both of the pieces 10 and 20 or 11 and 21 may be tungsten and one of the pieces 10 and 20 or 11 and 21 may be a different metal such as, for example, copper. The characteristic of these metals which makes them applicable to the present invention is that said metals all melt above the melting point of the composition and the composition is capable of wetting the clean surface of these metals and readily forms a solution with these metals.

As may now be apparent, the invention solves the problem of uniting high melting point metal parts with other high melting point metal parts or, alternately, uniting high melting point metal parts with metal parts having a lower melting point in a very effective and desirable way. The composition of the invention is especially applicable in the manufacture of vacuum tubes.

The features and principles underlying the invention described above in connection with specific exemplifications will suggest to those skilled in the art many other modifications thereof. It is accordingly desired that the appended claim shall not be limited to any specific embodiment or details shown and described in connection with the exemplifications thereof.

What is claimed is:

A composite article comprising: a tungsten part; and a copper part, said parts being united by a composition consisting essentially of about 0.7% to 1.3% of cobalt by weight, about 22.4% to 23.6% of copper by weight and about 75.7% to 76.3% of gold by weight, which composition and metal portions joined were heated to about 900±25° C. at which the composition was molten and had wetted said joined metal portions.

References Cited in the file of this patent

UNITED STATES PATENTS

| | | |
|---|---|---|
| 1,162,342 | Coolidge | Nov. 30, 1915 |
| 1,607,245 | Duhme | Nov. 16, 1926 |
| 1,917,378 | Lenfant | July 11, 1933 |
| 2,096,924 | Schwarzkopf | Oct. 26, 1937 |
| 2,164,938 | Peterson | July 4, 1939 |
| 2,427,727 | Huntley | Sept. 23, 1947 |